Oct. 8, 1963   W. H. SILVER ETAL   3,106,253
HITCH DEVICE

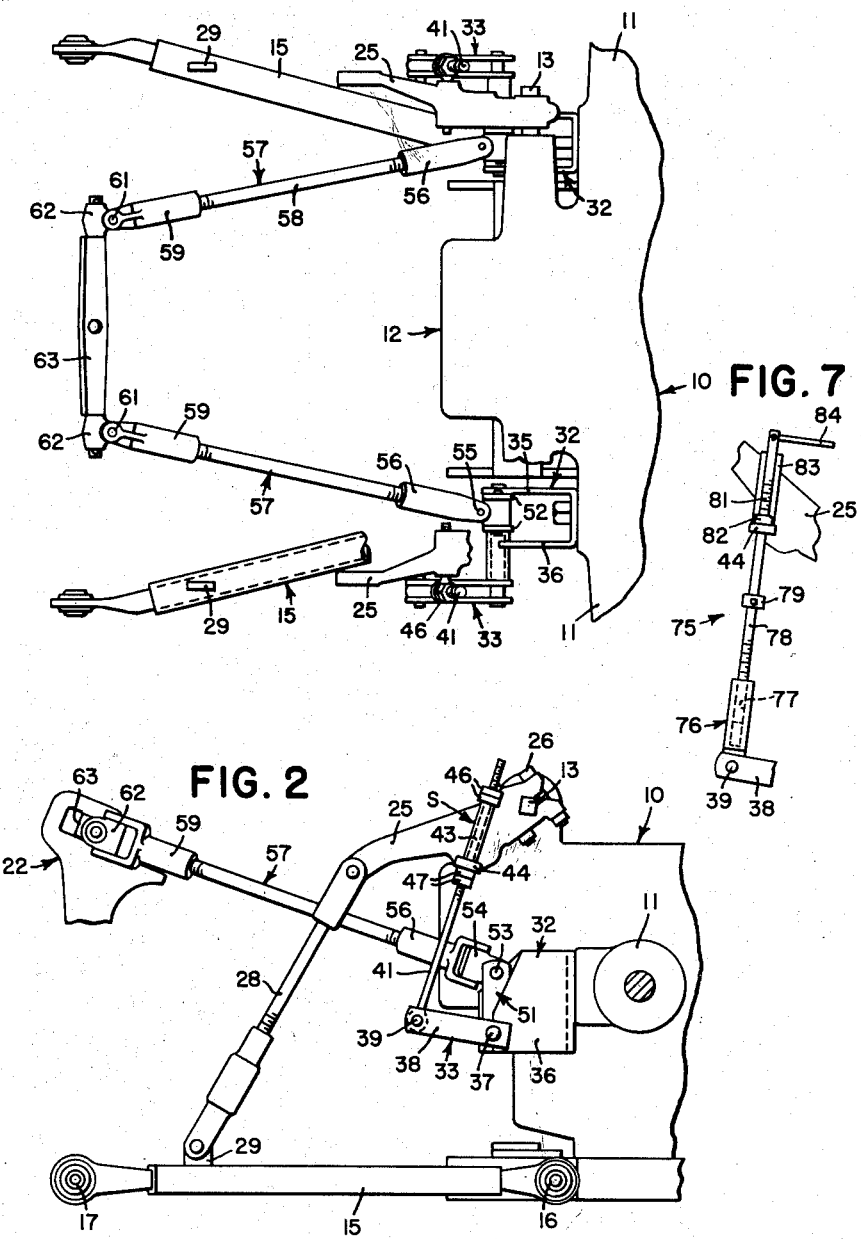

Original Filed March 1, 1955   2 Sheets-Sheet 2

INVENTORS.
WALTER H. SILVER
OREY W. OERMAN
BY
ATTORNEYS

United States Patent Office 3,106,253
Patented Oct. 8, 1963

3,106,253
HITCH DEVICE
Walter H. Silver, Brownsville, Tex., and Orey W. Oerman, Moline, Ill., assignors, by mesne assignments, to Deere & Company, a corporation of Delaware
Continuation of application Ser. No. 491,462, Mar. 1, 1955. This application Aug. 4, 1960, Ser. No. 47,532
10 Claims. (Cl. 172—239)

This application is a continuation of our copending application, Ser. No. 491,462, filed March 1, 1955 for Draft Responsive Hitch Control, now abandoned.

The present invention relates generally to agricultural machines and more particularly to tractor-implement combinations in which, in operation, the implement is adapted to follow the ground but, for transport purposes, is adapted to be raised entirely off the ground by power derived from the tractor.

The object and general nature of this invention is the provision of a tractor-implement combination of the type just mentioned, wherein provision is made to permit relatively long implements, such as three- or four-bottom plow or the like, to follow uneven ground surfaces when in plowing operation, but which may easily and conveniently be raised entirely off the ground by the power lift system of the tractor when it is desired to pass from field to field, along highways, roads, and the like.

More specifically, it is a feature of this invention to provide a hitch means so constructed and arranged that the implement may readily follow undulations in the ground surface, by virtue of a lost motion connection between the upper portion of the implement and the lift arm means of the tractor, with means so limiting the lost motion that, after the lost motion has been taken up, further operation of the tractor power lift raises the lift arm means and the lift arm means functions through a connection with the draft links to raise the front portion of the implement and through the lost-motion means to raise the rear portion of the implement. By virtue of this construction, adequate flexibility, as between the implement and the tractor, is provided, yet the rear end of the implement may be raised entirely off the ground to facilitate transport and to provide a normally adequate clearance between the rear portion of the implement and the ground so as to avoid entanglement with trash and the like.

A further feature of this invention is the provision of hitch means that is so constructed and arranged, first, that the effective line of draft extending between the center of resistance of the implement, such as a tractor plow, and the virtual hitch point on the tractor lies at a fairly large angle relative to a horizontal line, and, second, that the virtual hitch point lies in a relatively high position on the tractor, whereby, in effect, the hitch transfers weight from the plow and the front of the tractor to the rear drive wheels of the tractor. In other words, the hitch transforms a substantial portion of the draft resistance of the plow into downward pressure on the tractor drive axle and drive wheels.

A further feature of this invention is the provision of new and improved hitch means between a tractor and an implement of the power lifted type, wherein at least a portion of the draft reaction of the implement is transmitted first to the lift means as a lifting force, and thence to the implement.

These and other objects and advantages of the present invention will be apparent to those skilled in the art after a consideration of the following detailed description, taken in conjunction with the accompanying drawings, in which:

FIG. 1 is a plan view of the hitch portion of a tractor and implement combination including hitch mechanism constructed according to the principles of the present invention.

FIG. 2 is a side view of the arrangement shown in FIG. 1.

FIG. 5 is a view similar to FIG. 4, showing the position of the parts taken when the outfit travels through a depression such as a swale or the like.

FIG. 7 shows a modified form of the present invention, wherein means is provided for varying the amount of lost motion in the connections between the implement and the lift arm means of the tractor, whereby in the transport position, for example, raising the implement into a transport position does not raise the rear end of the implement an excessive amount as compared with the amount the front portion of the implement is raised.

Figure 8:
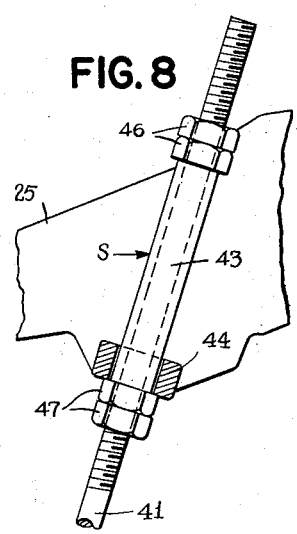

FIG. 8 is an enlarged view of the means providing lost motion between the implement and the tractor.

Figure 3:
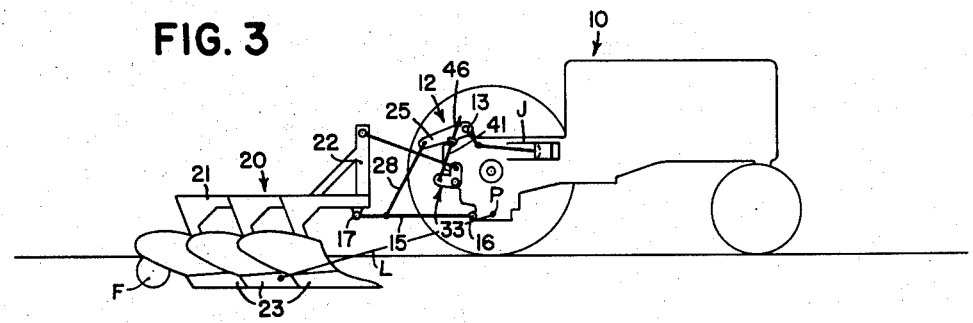
FIG. 3 is a diagrammatic view of the position of the plow, tractor and interconnecting means in normal operation on substantially flat land.

Referring first to FIGS. 1 and 2, the reference numeral 10 indicates a generally conventional farm tractor that includes laterally outwardly extending rear axle housings 11 and a power lift unit 12 of the type that includes a transversely disposed rockshaft 13 connected to be actuated by a power unit in the form of a hydraulic jack of the one-way acting type constructed, for example, along the lines of the power lift mechanism shown in the U.S. patent to Chambers et al. 2,437,875. A tractor of this type usually includes generally rearwardly extending draft links 15 connected at their forward ends by ball and socket joint means 16 with the lower rear portion of the tractor. The rear ends of the links 15 are connected by ball and socket joints 17 to the lower portion of the fore part of a ground-following implement that may, for example, be in the form of a relatively long multi-bottom plow, indicated in its entirety by the reference numeral 20. As best shown in FIG. 3, the implement 20 includes a generally fore-and-aft extending frame 21 having at its front end a generally vertically extending hitch frame portion 22 and a plurality of ground-engaging or ground-working tools 23, which may be conventional moldboard or disk furrow openers, or any other suitable ground-working or ground-following means.

The transversely disposed rockshaft 13 is provided with lift arm means in the form of a pair of generally rearwardly extending lift arms 25 rigidly fixed, as by clamping means 26, to the ends of the rockshaft 13. The rearmost end of each lift arm 25 is connected by link means 28 to a lug 29 carried by the rear portion of the associated draft link 15. One or both of these links 28 may be longitudinally adjustable, as desired. The links 28 are omitted from FIG. 1 for purposes of clarity. As will be clear from FIG. 2, whenever the lift arms 25 are swung upwardly or downwardly the rear ends of the draft links 15 are raised and lowered, with consequent raising and lowering of the associated portion of the implement 20.

Mounted at each side of the generally rear central portion of the tractor is a generally U-shaped bracket 32 that is fixed by the usual attaching studs to the axle housings 11 at portions thereon adjacent the rear central part of the tractor. A bell crank 33 is rockably mounted in each of the brackets 32, the side portions 35 and 36 of each bracket being apertured for the purpose of receiving the shaft 37 that forms a part of each bell crank 33. One arm 38 of each bell crank is disposed generally rearwardly and is connected at its outer end, as by a pivot 39, with the lower end of a generally upwardly extending link member 41. Each of the link members 41 extends upwardly and includes a sleeve portion 43 that is slidably disposed in a swivel eye 44 carried by the associated lift arm 25. The link 41 is threaded and receives an upper pair of lock nuts 46 and a lower pair of lock nuts 47. When the lock nuts are tightened, the sleeve 43 is fixed on the associated rod 41, and for normal operation the lock nuts 46, 47 are so arranged on the rod 41 that the lower lock nuts 47 lie against the swivel eye 44, serving thereby as a stop, as will be explained later. As will be clear from FIGS. 2 and 8, the rod 41 may slide downwardly in the eye 44 to the extent permitted by the space between the eye member 44 and the upper lock nuts 46, thus providing a limited amount of relative movement between the link 41 and the associated lift arm 25, constituting lost-motion means to which reference will also be made later.

Each of the bell cranks 33 also includes a generally upwardly extending arm 51, each arm 51 including a pair of interconnected bars 52, as shown in FIG. 1, and the upper ends of these bars are apertured to receive a pivot 53 that connects each bell crank arm 51 with an associated swivel block 54 which, in turn, is pivoted at 55 (FIG. 1) with the forward yoke member 56 that forms a part of an upper link 57. There are two members 57, each including a forward yoke member 56, a threaded intermediate member 58, and a rear yoke member 59, pivotally connected, as at 61, to associated swivel members 62 by which a transverse bar 63 is movably connected with the upper links 57. As will be clear from FIG. 1, the forward end of each of the links 57 is connected to the associated bell crank 33 and, as will be clear from FIG. 2, the bell cranks and the associated parts have limited freedom of movement in a counterclockwise direction by virtue of the space S forming the lost motion mentioned above. The central portion of the bar 63 is pivotally or swivelly connected in any suitable way with the upper portion of the implement hitch frame 22.

The operation of the device of the present invention is substantially as follows.

Normal plowing position on level ground is indicated in FIGS. 2 and 3. The draft pull, transmitted to the plow through the lower draft links 15, is represented by the line L in FIG. 3 extending from the center of resistance of the plow 20 to the effective or virtual hitch point P on the tractor provided by the lower and upper links 15 and 57 whose motion, as the plow swings up and down relative to the tractor (FIGS. 4 and 5), is modified by the bell cranks 33. The draft force acts to pull the implement through the ground, and since the soil resistance is applied to the plow bottoms 23 at a point below the draft links 15, there is some tendency for the implement to tumble forwardly, but this is resisted by the draft members 57 and associated parts, acting as an upper compression link means, transmitting the forwardly directed thrust to the bell crank 33, clockwise movement of which is resisted by the lower lock nuts 47 bearing upwardly against the swivel eye 44 on the associated lift arm 25. The arm 25 is not moved upwardly, although it is free to do so by virtue of the one-way power lift device of the tractor, because the suction of the tools and/or the weight of the implement itself prevent the draft links 15 from swinging upwardly at their rear ends, as will be seen from FIG. 3. Normally, therefore, the implement 20 operates in a generally level plowing position with the draft and reaction forces arranged in balance. If it should be desired to increase the depth of operation, the lower stop nuts 47 may be adjusted downwardly to permit the lift arms 25 to move to a lower position, and also the upper links 57 may be appropriately adjusted to accommodate a deeper depth of operation. As will be seen from FIG. 3, normally the contact of the lower stop 47 with the associated lift link 25 limits the downward movement of the front end of the member, and therefore a gauge wheel is not necessary for most conditions of operation but may be used where very close accurate control of depth under almost all conditions is desired. Also, the depth of operation may be increased or decreased temporarily by raising or lowering the power lift arms 25.

Figure 4:
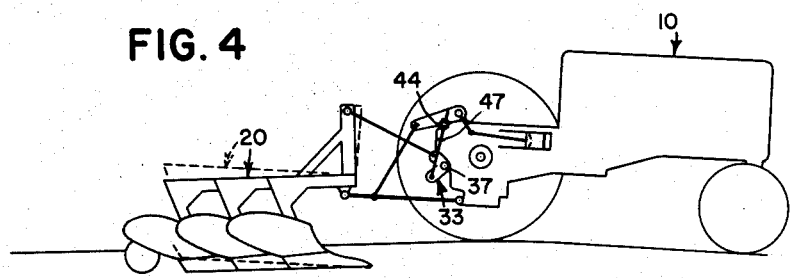
FIG. 4 is a diagrammatic view showing the positions of the parts taken when the outfit passes over a ridge or raised portion in the ground surface.

As will be seen from FIG. 4, the rear end of the implement may swing downwardly relative to its point of connection with the rear ends of the draft links 15, whereby the outfit maintains substantially the desired depth when passing over ridges or the like. As will be seen from FIG. 2, adjusting the effective length of the links 57 would have substantially the same effect as raising or lowering the stops 47 on the associated links 41. When the tractor and implement combination passes over a rise, as illustrated somewhat diagrammatically in FIG. 4, the implement is free to swing downwardly, relative to the tractor, because of the lost motion provided between the swivel eye 44 and one or the other of the abutment stops 46 and 47 on the link member 41. Thus, when the outfit travels over a rise or ridge, the rear end of the implement 20, by virtue of its own weight, follows along the ground surface and the upper link means 57 pulls rearwardly on the bell crank, swinging the latter in a counterclockwise direction and at least partially taking up the lost motion provided between the swivel eye 44 and the upper abutment or stop 46. Under this condition, the weight of the plow and the suction, if any, of the rearmost tools overcome the normal tendency for the implement to tumble forwardly as discussed above in connection with FIG. 3. Therefore, as the outfit passes over a rise, the plow 20 operates at about the same depth as in level plowing. If the lost motion available by virtue of the present invention were not present, when the tractor 10 passes down the side of a ridge or the like, as shown in FIG. 4, the plow would be pulled almost out of the ground at the rear end, as indicated in dotted lines in FIG. 4.

Figure 5:
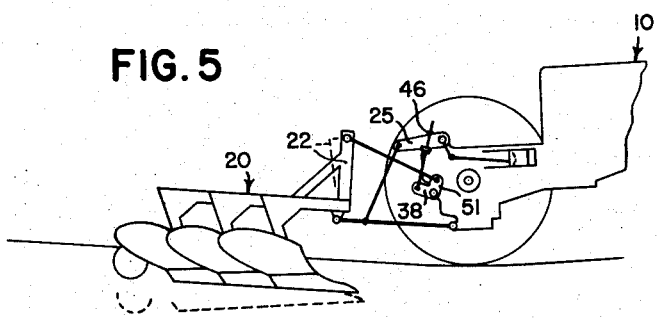

When the outfit travels through a swale or depression, the parts take the position indicated in FIG. 5. When the implement 20 tends to swing upwardly relative to the tractor, as when going through a swale or the like, the bell crank is shifted in a clockwise direction and, acting through the lock nuts 47 and the eye 44, the lift arm means is swung upwardly, which may occur relatively freely by virtue of the one-way hydraulic jack arrangement that is a characteristic of the power lift means 12 of the tractor 10. Thus, in passing through a swale or depression, the implement 20 operates substantially at the same uniform depth as in level plowing. If the bell crank arrangement of the present invention were not present, the implement would be constrained to take the position indicated in dotted lines in FIG. 5, either running too deep at the rear end or too shallow at the front end. (For convenience of illustration, the dotted lines of FIG. 5 indicate the implement as running too deep.)

Figure 6:
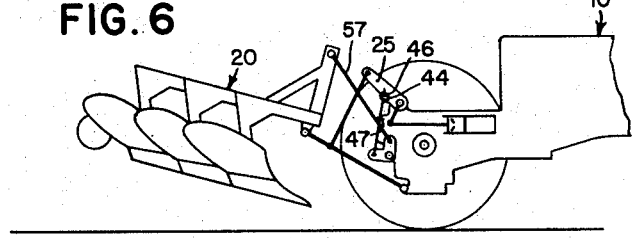
FIG. 6 is a view showing the position the parts take when the implement is raised into a transport position.

For transport purposes, it is desirable to support the weight of the entire implement on the tractor, and this is accomplished, according to the present invention, by utilizing the hydraulic jack of the tractor power lift unit for raising the implement entirely off the ground, as indicated in FIG. 6. When the hydraulic jack is extended the full amount, the lost motion between the link 41 and associated power lift arm 25 is completely taken up and the resulting power actuation of the bell crank 33 in a clockwise direction, as shown in FIGS. 2 and 6, results in a pull being exerted through the links 41 against the bell cranks 33, and through the latter and the link means 57 against the upper end of the front portion of the implement, thus raising the rear end of the implement. At the same time, however, the upward swinging of the power-actuated lift arms 25 also raises the front end of the implement through the raising of the lower draft links 15. The pivot points are so chosen and the degree of lost motion so determined that when the power lift unit has been operated to the fully raised position, the rear end of the implement 10 is lifted only a relatively small amount beyond a more or less level position, not only entirely out of contact with the ground, but high enough at its rear end to provide for passage of the outfit in transport over uneven ground, as may sometimes be encountered when driving from one field to another. By not raising the rear end of the implement any more than necessary, and much less than with the conventional three-point hitch when used with a relatively long implement, such as a three- or four-bottom plow, excessive loads on the power lift system are prevented, yet the implement may easily and readily be transported by virtue of being supported entirely on the tractor.

In the form of the invention shown in FIG. 2, the amount of lost motion is determined by the sleeve 43 and is a relatively fixed amount. However, the depth of plowing may be increased or decreased by changing the position of the lower stop nuts 47, which also requires a similar change in the position of the upper stop nuts 46. In providing for a greater depth of operation, for example, the stop nuts 47 may be lowered, which, as just stated, also requires a lowering of the upper stop nuts 46. This is ordinarily unobjectionable, but in the case of very long implements, it may mean that the rear end of the implement, when the latter is raised into its transport position, is lifted higher than is necessary or desirable. Accordingly, we have provided a modified form of mechanism, shown in FIG. 7, in which the position of the lower stop means is adjusted, preferably from the operator's station on the tractor 10, without making any change in the effective position of the upper stop means. Referring now to FIG. 7, an adjustable link construction, indicated in its entirety by the reference numeral 75, is connected at its lower end with each bell crank arm 38 through the pivot 39 mentioned above. Each link construction 75 includes a lower sleeve member 76 having an internally threaded socket 77 in which the lower threaded end of a generally vertically extended rod 78 is disposed. Lower portion of the rod 78, just above the lower threaded section, carries a boss or collar 79 fixed in any suitable way to the rod 78. Preferably, the boss or collar 76 is fixed, but if desired, the member 79 may be in the nature of a set screw collar which itself is capable of some adjustment along the rod 78. The upper portion of the rod 78 is also threaded, as indicated at 81, and this portion receives a nut member 82 threaded thereon and lying above the eye member 44 carried by the associated lift arm 25. In this form of the invention, an elongated plate 83 is fixed to the eye member 44 and disposed alongside the associated nut 82 so that the latter is retained against turning when the rod member 78 is rotated. This may be done by means of a handle 84 that is pivotally connected to the upper end of the rod 78.

In this form of the invention, as will be seen from FIG. 7, turning the rod 78 by means of the handle 84 serves to screw the rod member 78 into or out of the lower socket member 76, thus raising or lowering the lower stop part 79 relative to the bell crank, but the distance between the upper stop member 82 and the pivot 39 on the bell crank arm 38 does not vary, since the nut member 82 is held against rotation and the rotation of the rod 78, as to advance the same downwardly into the socket member 76, also advances the rod 78 downwardly relative to the nut member 82 by exactly the same amount. Thus, according to this form of the invention, the depth of plowing may be adjusted by raising or lowering the lower stop 79 but without changing the position of the upper stop 82 relative to the bell crank, thus, in effect, providing for raising the implement to substantially the same position when the power lift of the tractor is operated to raise the lift arm 25, irrespective of the adjustment of the lower stops 79 for controlling the depth of operation.

While we have shown and described above the preferred structure in which the principles of the present invention have been incorporated, it is to be understood that our invention is not to be limited to the particular means, shown and described above, but that, in fact, widely different means may be employed in the practice of the broader aspects of our invention.

What we claim, therefore, and desire to secure by Letters Patent is:

1. The combination with a tractor having a power lift system that includes a rockshaft, lift arm means fixed thereto and power means connected with said rockshaft and including a one-way hydraulic jack for raising said lift arm means, and a ground-following implement, of hitch means to connect said implement with the tractor for generally vertical swinging movement relative thereto about a transverse axis adjacent the rear portion of said hitch means, comprising a pair of lower draft links connected at their rear ends to the implement and at their forward ends to the tractor, lift link means connecting said lift arm means with said draft links, upper link means connected at its rear end to an upper portion of the implement and adapted to be moved forwardly due to soil pressure against the implement below said axis, motion-transmitting means connecting the forward portion of said upper link means with said lift arm means, said motion-transmitting means including a bell crank, pivot means rotatably mounting said bell crank on the tractor below said rockshaft, said bell crank having first and second arm means, said first arm means extending generally upwardly from said pivot means and said second arm means extending generally rearwardly from said pivot means, the outer end portion of the first arm means being connected with the forward end of the upper link means, means extending generally upwardly from the outer end portion of the second arm means of said bell crank to said lift arm means, said bell crank arms, said lift link means and said upwardly extending means being so constructed and arranged that forward implement thrust imposed on said upper link means is transmitted to said lift arm means and through said lift link means to said lower draft links, said generally upwardly extending means having a part movable through a limited amount relative to the associated lift arm means, and a pair of spaced apart stops carried by one of said part and said lift arm means determining the amount of lost motion between said motion-transmitting means and said lift arm means.

2. The invention set forth in claim 1, further characterized by said motion-transmitting means including a rod, a pair of stops adjustable along said rod, said stops forming a part of said lost-motion means, and means for adjusting the position of one of said stops relative to the other.

3. The combination with a tractor having a power lift system that includes lift arm means and power means including a one-way hydraulic jack for raising said lift arm means, and a ground-following implement, of hitch means to connect said implement with the tractor for generally vertical swinging movement relative thereto about a transverse axis adjacent the rear portion of said hitch means, comprising a pair of lower draft links connected at their rear ends to the implement and at their forward ends to the tractor, lift link means connecting said lift arm means with said draft links, upper link means connected at its rear end to an upper portion of the implement and adapted to be moved forwardly due to soil pressure against the implement below said axis, a bell crank mounted on the tractor and having an upwardly extending arm pivotally receiving the forward end portion of said upper link means, the other arm of said bell crank means extending rearwardly, and means connecting said other arm with the associated lift arm means, said last mentioned connecting means comprising a lower part having a threaded socket, an upper part including a rod member threaded into said lower part and movable relative to the latter by rotataing said rod member, means on said lift arm means slidably receiving the upper portion of said rod member, an upper stop carried by the rod member above said rod-receiving means on the lift arm means, a fixed stop carried by said rod member below said rod-receiving means, said upper stop being threaded onto the upper portion of said rod member, means for rotating the latter to raise and lower said lower stop relative to said other bell crank arm, and means constraining said upper stop against rotation, the screw threads of said sockets and said upper stop being of the same hand whereby rotation of said rod member to raise and lower the latter relative to the bell crank serves to maintain substantially the same special relationship between said upper stop and said other arm of said bell crank means.

4. The combination with a tractor having a power lift system that includes lift arm means and power means for raising said lift arm means, of a ground following implement, draft-transmitting means connecting the implement with the tractor for generally vertical swinging movement relative thereto about a transverse axis adjacent the rear portion of said draft-transmitting means, said implement being adapted to swing forwardly about said axis due to soil pressure against the implement below said axis, lift link means connecting said lift arm means with said draft-transmitting means, and means connected to transmit movement due to said forward swinging of the implement to said lift arm means in a direction to raise said lift arm means by virtue of the tendency of the implement to tilt forwardly about said axis, said reaction transmitting means including lost-motion means accommodating tilting of the implement rearwardly about said axis relative to the tractor independently of the draft reaction.

5. The combination of a tractor having lift arm means, a draft creating implement, the upper portion of the implement tending to move forwardly relative to the lower portion of the implement due to increased soil pressure against the implement, draft-transmitting means swingably connecting the implement with the tractor, lifting link means connected between said draft-transmitting means and said arm means, whereby upward movement of the lift arm means acts to raise said draft-transmitting means and the implement connected therewith, bell crank means swingably fulcrumed on the tractor for movement relative thereto about an axis and having one arm connected with the lift arm means, whereby movement of said bell crank in one direction about said axis acts to tend to raise said lift arm means, means connecting the implement with the bell crank means at a point spaced from the axis of movement of the bell crank and in a direction therefrom such that the draft reaction of the implement due to increased soil pressure on the implement will be imposed on the bell crank means through the connecting means and tend to swing said bell crank in the aforesaid one direction and thereby shift said lift arm means upwardly and raise said draft transmitting means, and lost motion means acting between the bell crank means and the implement, said lost motion means permitting the bell crank to move in a direction opposite to aforesaid one direction without corresponding movement in the lift arm means.

6. The combination with a tractor including a power operated rockshaft, and a draft creating implement trailing the tractor, the upper portion of the implement tending to move forwardly relative to the lower portion of the implement due to increased soil pressure against the implement, of hitch means connecting the implement to the tractor, comprising lift arm means on said rockshaft, lever means separate from the rockshaft and lift arm means and rockably mounted on the tractor below said rockshaft and lift arm means, said lever means having first and second movable lever portions, means connecting the implement and the first lever portion of said lever means for transmitting movement of the implement in one direction due to increased soil pressure at least in part to said lever means, force-transmitting means extending upwardly from the second lever portion of said lever means to said lift arm means for transmitting said aforesaid movement at least in part to the lift arm means as a lifting force, lift link means connecting said lift arm means with the implement for transferring at least part of said lifting force to the implement, and lost motion means acting between the lever means and the implement, said lost motion means permitting the lever means to move in a direction opposite to aforesaid one direction without corresponding movement in the lift arm means.

7. The combination with a tractor having a power lift system including lift arm means, power means for raising said lift arm means, a pair of lower generally horizontal draft links pivoted at their forward ends to the tractor, and lift means connecting said draft links with said lift arm means, of an implement having a forward generally vertical hitch frame portion pivotally connected at its lower portion to the rear end portions of said draft links for movement relative there to about a generally transverse axis, a bell crank pivoted on the rear portion of the tractor and having a generally horizontal rearwardly extending arm and a generally vertically extending arm, a thrust link connected at its rear end to the upper portion of said hitch frame portion and at its forward end to the upper portion of said generally vertical bell crank arm, and means connecting the rear portion of the horizontal bell crank arm with said lift arm means, whereby a forwardly directed thrust exerted against said vertical bell crank arm acts through the other bell crank arm to tend to raise said lift arm means and said draft links, said last mentioned connecting means including lost motion means accommodating a limited amount of movement of the implement in a generally rearward direction about said transverse axis.

8. The invention set forth in claim 7, further characterized by stop means connected with the bell crank for limiting the movement of said horizontal bell crank arm downwardly away from said lift arm means.

9. The combination with a tractor having a transverse power-operated rockshaft, and an implement trailing the tractor, of hitch means connecting the implement to the tractor and comprising rearwardly extending lift arm means on the rockshaft, lever means separate from the rockshaft and the lift arm means, pivot means rotatably mounting said lever means on the tractor, said lever means having first and second arm means, force-transmitting means connecting the second arm means of the lever means to the lift arm means for raising said lift arm means in response to movement of the second arm means in one direction, said force transmitting means including a lost motion action between said second arm means and said lift arm means to permit said lever means to move freely in the opposite direction, means connected with the implement for imposing a draft force on said first lever arm, and means connecting the lift arm means with the implement.

10. The invention set forth in claim 9, further characterized by said lost motion means including relatively movable parts accommodating generally vertical movement of the implement relative to the tractor.

References Cited in the file of this patent

UNITED STATES PATENTS

| | | |
|---|---|---|
| 2,547,438 | Burkholder | Apr. 3, 1951 |
| 2,785,616 | Jones | Mar. 19, 1957 |
| 2,971,589 | DuShane | Feb. 14, 1961 |

FOREIGN PATENTS

| | | |
|---|---|---|
| 869,272 | Germany | Mar. 2, 1953 |